US012596507B2

(12) United States Patent
Lee et al.

(10) Patent No.: US 12,596,507 B2
(45) Date of Patent: Apr. 7, 2026

(54) APPARATUS AND METHOD FOR CONTROLLING NONVOLATILE MEMORY

(71) Applicant: ELECTRONICS AND TELECOMMUNICATIONS RESEARCH INSTITUTE, Daejeon (KR)

(72) Inventors: Suk-Ho Lee, Daejeon (KR); Kyu-Seung Han, Daejeon (KR); Jae-Jin Lee, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 118 days.

(21) Appl. No.: 18/587,463

(22) Filed: Feb. 26, 2024

(65) Prior Publication Data

US 2025/0013378 A1 Jan. 9, 2025

(30) Foreign Application Priority Data

Jul. 4, 2023 (KR) ........................ 10-2023-0086665

(51) Int. Cl.
*G06F 3/06* (2006.01)
(52) U.S. Cl.
CPC ................................. *G06F 3/0679* (2013.01)
(58) Field of Classification Search
CPC .................................................... G06F 3/0679
See application file for complete search history.

(56) References Cited

U.S. PATENT DOCUMENTS

| | | | | |
|---|---|---|---|---|
| 7,543,114 B2 * | 6/2009 | Cho | ..................... | G06F 12/0862 |
| | | | | 365/189.02 |
| 8,954,708 B2 | 2/2015 | Kim et al. | | |
| 8,996,790 B1 * | 3/2015 | Segal | .................. | G06F 12/0246 |
| | | | | 711/E12.008 |
| 2008/0052449 A1 * | 2/2008 | Kim | ..................... | G11C 7/1045 |
| | | | | 711/E12.079 |
| 2008/0155219 A1 | 6/2008 | Pyeon et al. | | |
| 2010/0217924 A1 | 8/2010 | Panabaker et al. | | |

(Continued)

FOREIGN PATENT DOCUMENTS

| | | | | |
|---|---|---|---|---|
| JP | 4213045 B2 * | 1/2009 | ............. | G06F 12/00 |
| KR | 10-0546403 B1 | 1/2006 | | |

(Continued)

OTHER PUBLICATIONS

Translation of JP-4213045-B2 (Year: 2009).*
JP-4213045-B2 (Year: 2009).*

*Primary Examiner* — Henry Tsai
*Assistant Examiner* — John B Roche
(74) *Attorney, Agent, or Firm* — Sughrue Mion, PLLC

(57) ABSTRACT

Disclosed herein is an apparatus and method for controlling nonvolatile memory. The apparatus may include nonvolatile memory and a memory controller for issuing a serial clock (SCK) to the nonvolatile memory and transferring data corresponding to a requested command to the nonvolatile memory or receiving data corresponding to a requested command from the nonvolatile memory and outputting the data to the outside through a serial-in or a serial-out in response to a read request or a write request.

9 Claims, 6 Drawing Sheets

(56)        References Cited

U.S. PATENT DOCUMENTS

2013/0326090  A1 *  12/2013  Gillingham ......... G06F 11/3037
                                                                710/5
2022/0004331  A1      1/2022  Lin
2023/0135891  A1      5/2023  Eun et al.

FOREIGN PATENT DOCUMENTS

KR      10-2009-0026276  A      3/2009
KR      10-2013-0075135  A      7/2013
KR      10-2014-0040516  A      4/2014
KR      10-2023-0063170  A      5/2023

* cited by examiner

APPARATUS AND METHOD FOR CONTROLLING NONVOLATILE MEMORY

CROSS REFERENCE TO RELATED APPLICATION

This application claims the benefit of Korean Patent Application No. 10-2023-0086665, filed Jul. 4, 2023, which is hereby incorporated by reference in its entirety into this application.

BACKGROUND OF THE INVENTION

1. Technical Field

The disclosed embodiment relates to technology for directly controlling nonvolatile memory embedded in a Processing-In-Memory (PIM) processor.

2. Description of the Related Art

Nonvolatile memory such as flash memory has a low operation speed, and read, write, and erase operations are performed based on commands sent by a host processor (master).

Here, due to the latency arising from the intervention of the host processor and a series of command protocols for each operation, nonvolatile memory has a low degree of freedom in use, unlike volatile memory such as Random-Access Memory (RAM).

In a structure into which nonvolatile memory and a processor are integrated, such as a Processing-In-Memory (PIM) processor for high-speed AI processing, technology for reducing such time overhead is required.

SUMMARY OF THE INVENTION

An object of the disclosed embodiment is to enable nonvolatile memory such as flash memory to be simply and directly accessed like volatile memory, rather than using a method in which a host processor transfers commands for access.

An apparatus for controlling nonvolatile memory according to an embodiment may include nonvolatile memory and a memory controller for issuing a serial clock (SCK) to the nonvolatile memory and transferring data corresponding to a requested command to the nonvolatile memory or receiving data corresponding to a requested command from the nonvolatile memory and outputting the same to the outside through a serial-in or a serial-out in response to a read request or a write request.

Here, the memory controller may include a read protocol converter that issues a serial clock (SCK) and a serial-in (SI) signal corresponding to a read command to the nonvolatile memory when a read signal and a chip_enable signal are enabled and a read address is applied.

Here, when a serial-out (SO) signal corresponding to data requested to be read is output from the nonvolatile memory, the read protocol converter may output the data to the outside.

Here, the data output through the serial-out (SO) signal may be output in units of bytes.

Here, the memory controller may include a write protocol converter that issues a serial clock (SCK) and a serial-in (SI) signal corresponding to a write command and data input to the nonvolatile memory when a write signal and a chip_enable signal are enabled and a write address and a data input signal are applied.

Here, the memory controller may further include a written sector checker for checking whether a sector corresponding to the write address in the nonvolatile memory is a written sector.

Here, the write protocol converter may issue a serial-in (SI) signal corresponding to an erase command before the write command based on a result of checking by the written sector checker whether the sector corresponding to the write address in the nonvolatile memory is a written sector.

Here, the write protocol converter may automatically insert a serial-in (SI) signal corresponding to a write_enable command (WEN) before the write command or the erase command.

A method for controlling nonvolatile memory according to an embodiment may include receiving a read address when a read signal and a chip_enable signal are enabled; and issuing a serial clock (SCK) and a serial-in (SI) signal corresponding to a read command to nonvolatile memory.

Here, the method may further include, in response to output of a serial-out (SO) signal corresponding to data requested to be read from the nonvolatile memory, outputting the data to the outside.

Here, the data output through the serial-out (SO) signal may be output in units of bytes.

A method for controlling nonvolatile memory according to an embodiment may include receiving a write address and a data input signal when a write signal and a chip_enable signal are enabled; and issuing a serial clock (SCK) and a serial-in (SI) signal corresponding to a write command and data input to nonvolatile memory.

Here, the method may further include checking whether a sector corresponding to the write address in the nonvolatile memory is a written sector.

Here, issuing the serial clock and the serial-in signal may comprise issuing a serial-in (SI) signal corresponding to an erase command before the write command based on a result of checking whether the sector corresponding to the write address in the nonvolatile memory is a written sector.

Here, the method may further include automatically inserting a serial-in (SI) signal corresponding to a write_enable command (WEN) before the write command or the erase command.

BRIEF DESCRIPTION OF THE DRAWINGS

The above and other objects, features, and advantages of the present disclosure will be more clearly understood from the following detailed description taken in conjunction with the accompanying drawings, in which.

3

Figure 6:
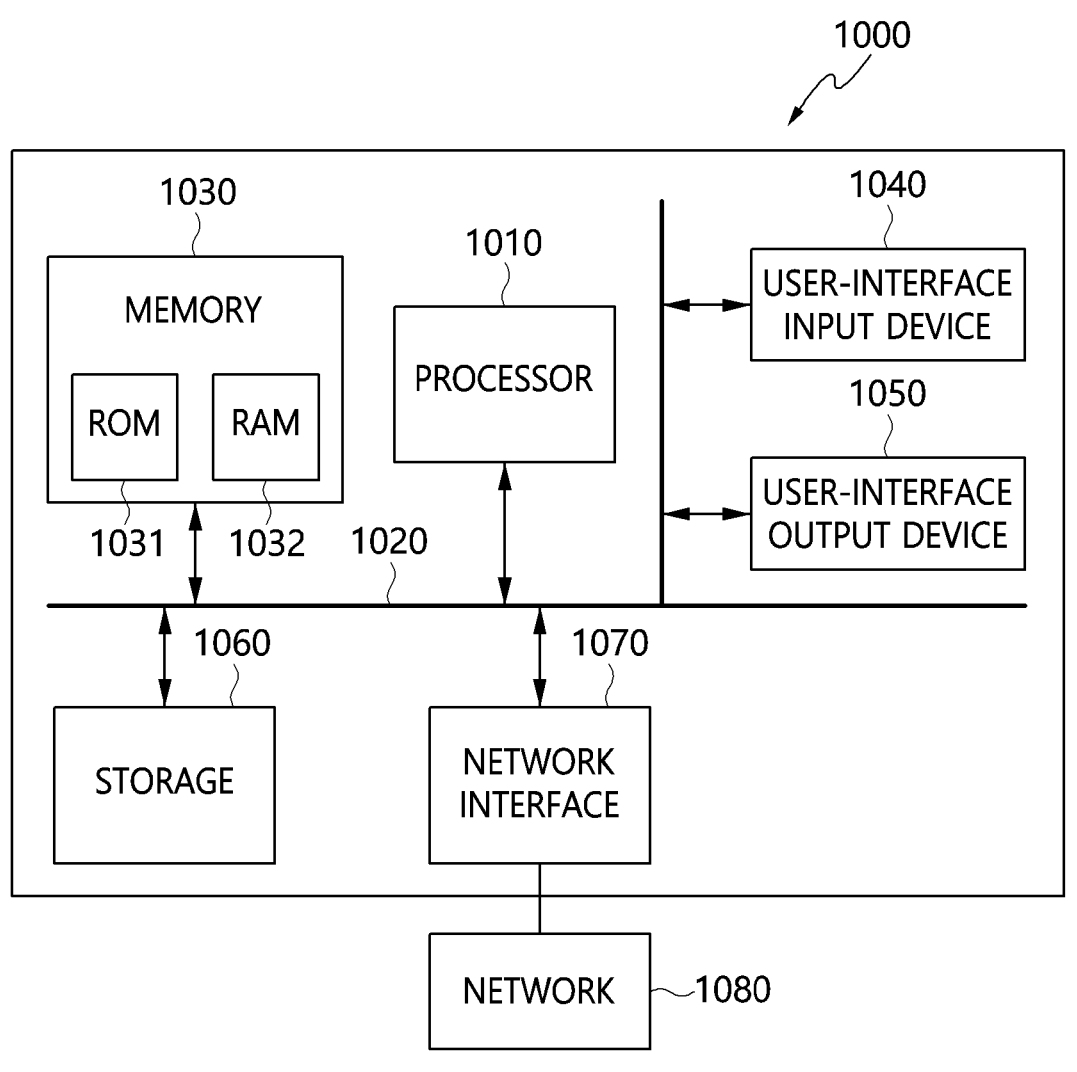

FIG. 6 is a view illustrating a computer system configuration according to an embodiment.

DESCRIPTION OF THE PREFERRED EMBODIMENTS

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

Reading from flash memory, which is nonvolatile memory, is performed whereby a host processor transfers a sequence of two commands, Read_command(0x☐☐h)+ Read_Address, to the memory.

Also, writing is performed by transferring a sequence of three commands, Write_Enable_Command(0x☐☐h)+ Write_Command(0x☐☐h)+Write_Address to the memory.

Here, when specific data has been written to a specific sector of the flash memory, writing becomes possible after the existing data is erased (e.g., all values are changed to 0xff) by transferring a series of three commands, Write_Enable_Command(0x☐☐h)+Sector_Erase_Command(0x☐☐h)+Erase_Address.

Therefore, in order to use the flash memory like random access memory, a combination of multiple (six) commands and addresses for erase and write operations is required for the write. When this process is controlled by a host processor, not only cycles for access to the nonvolatile memory but also additional cycles for processing are required, which causes access latency.

In an embodiment, in order to randomly access nonvolatile memory like RAM, a corresponding signal is generated through a memory controller capable of direct access to nonvolatile hardware, rather than through transfer of a command by a host processor.

Figure 1:
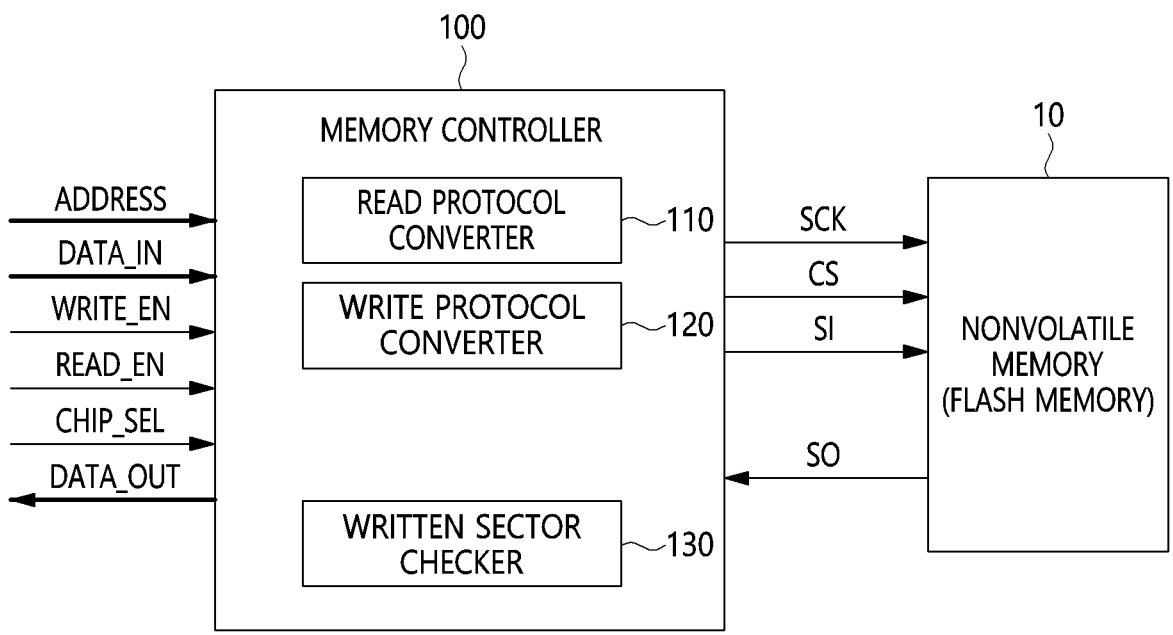
FIG. 1 is a schematic block diagram of an apparatus for controlling nonvolatile memory according to an embodiment.

FIG. 1 is a schematic configuration diagram of an apparatus for controlling nonvolatile memory according to an embodiment.

Referring to FIG. 1, the apparatus for controlling nonvolatile memory according to an embodiment may include nonvolatile memory 10 and a memory controller 100.

Here, the apparatus for controlling nonvolatile memory may a nonvolatile direct memory controller embedded in a PIM processor.

Here, Processing-In-Memory (PIM) is a next-generation semiconductor formed by integrating memory and a processor into a single chip, and is technology expected to solve a data bottleneck phenomenon and an excessive power consumption problem caused in existing computing architectures in which memory and a processor are separated.

Here, the nonvolatile memory 10 may be flash memory.

In response to a read or write request, the memory controller 100 may issue a serial clock SCK to the nonvolatile memory 10 and also transfer data corresponding to the requested command to the nonvolatile memory or receive data corresponding to the requested command from the nonvolatile memory and output the data to the outside through a serial-in or a serial-out.

Accordingly, the memory controller 100 may enable a read operation or a write operation to be performed using the same protocol method as access to volatile memory (RAM). That is, when address ("ADDRESS"), data in/out ("DATA_IN" and "DATA_OUT"), and read/write_enable signals ("READ_EN" and "WRITE_EN") are input to the memory controller 100 in the same manner as input/output in random-access memory (RAM), the memory controller 100 issues a serial clock (SCK) and chip select (CS), serial-in (SI), and serial-out (SO) signals in order to access the nonvolatile memory 10.

Here, the memory controller 100 may include a read protocol converter 110 for processing a read request and a write protocol converter 120 for processing a write request.

Also, the memory controller 100 may further include a written sector checker 130 for checking whether a sector corresponding to the write address in the flash memory is a written sector when it processes a write request.

Figure 2:
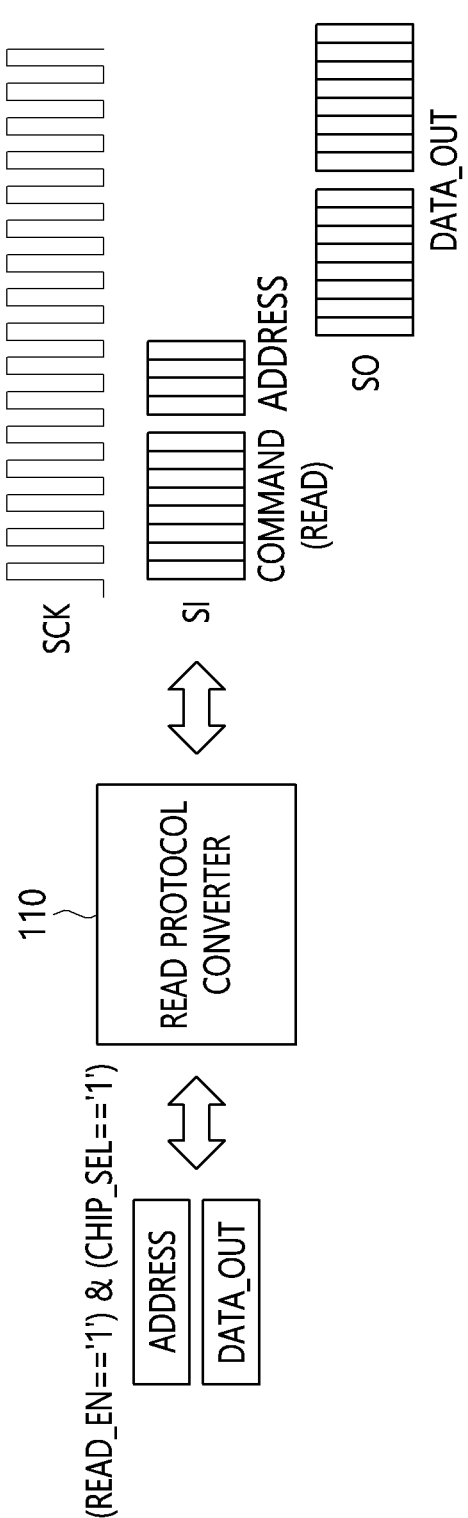
FIG. 2 is a view for explaining input/output of a read protocol converter according to an embodiment.
Figure 3:
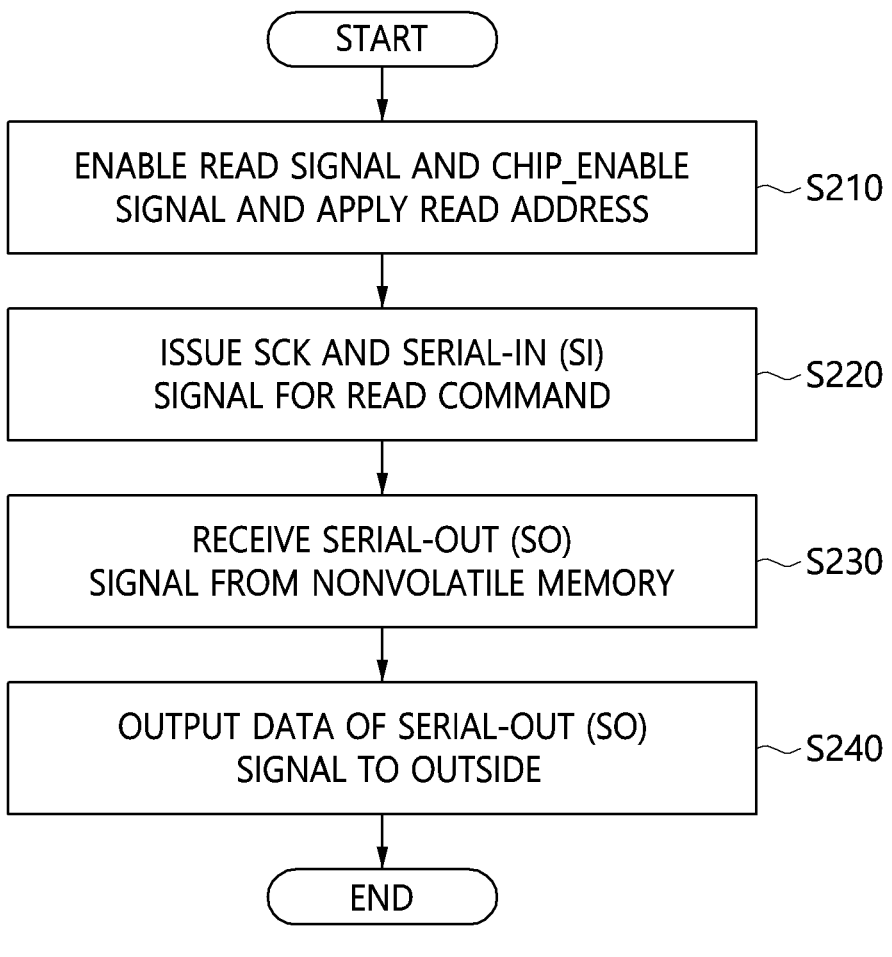
FIG. 3 is a flowchart for explaining a method of reading by a read protocol converter according to an embodiment.

FIG. 2 is a view for explaining input/output of a read protocol converter according to an embodiment, and FIG. 3 is a flowchart for explaining a method of reading by the read protocol converter according to an embodiment.

Referring to FIG. 2 and FIG. 3, the read protocol converter 110 may issue a serial clock (SCK) and a serial-in (SI) signal corresponding to a read command at step S220 in order to read data from the nonvolatile memory 10 when a read signal and a chip_enable signal ("CHIP_SEL" as shown in FIG. 1) are enabled and a read address is applied at step S210.

In response to the serial-in (SI) signal, the flash memory 10 outputs serial data to the read protocol converter 110 through a serial-out (SO) signal at step S230.

Subsequently, the read protocol converter 110 may output the data of the serial-out (SO) signal corresponding to the data requested to be read, which is output from the nonvolatile memory 10, to the outside at step S240.

Here, the data output through the serial-out (SO) signal may be output in units of bytes.

5
6

Figure 4:
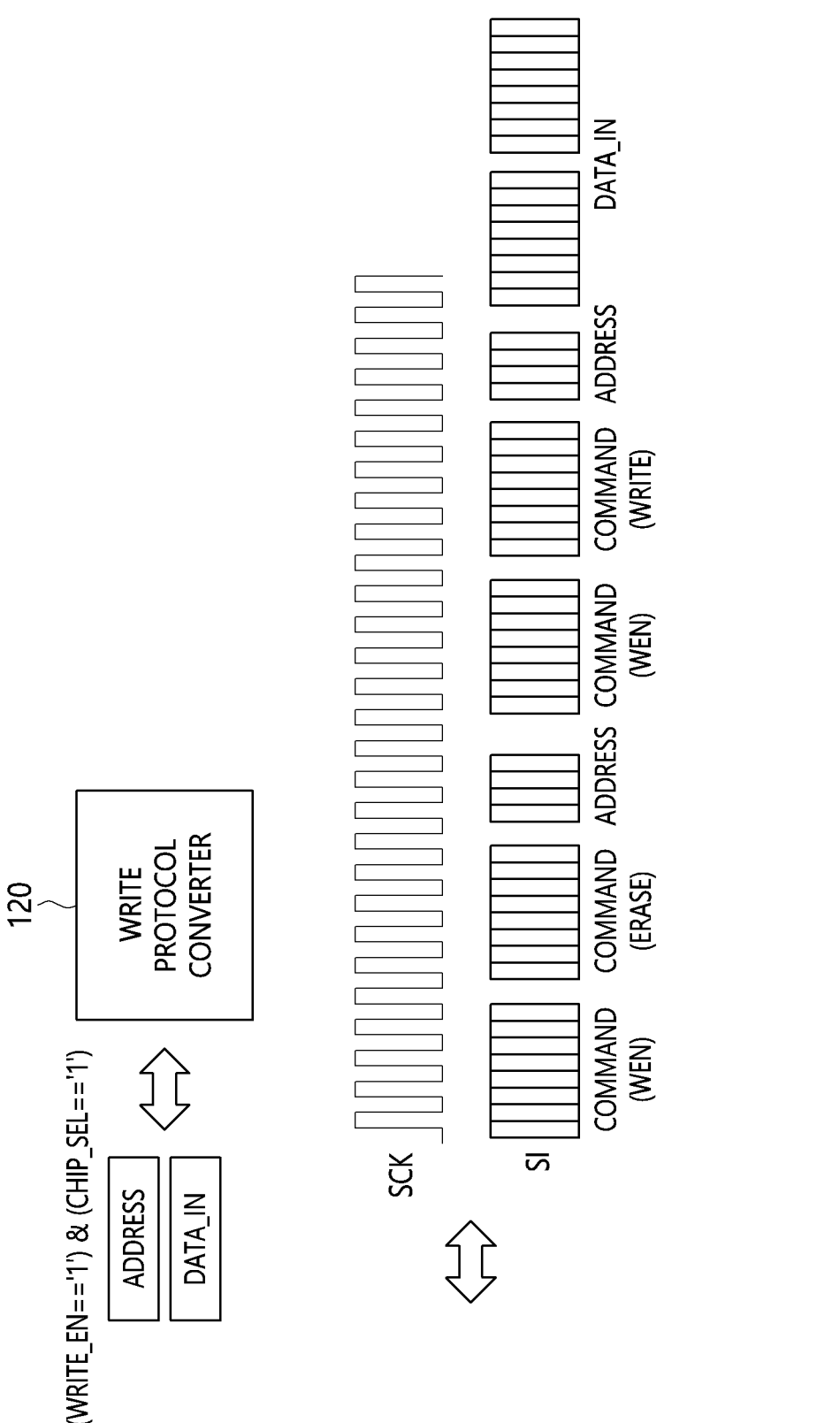
FIG. 4 is a view for explaining input/output of a write protocol converter according to an embodiment.
Figure 5:
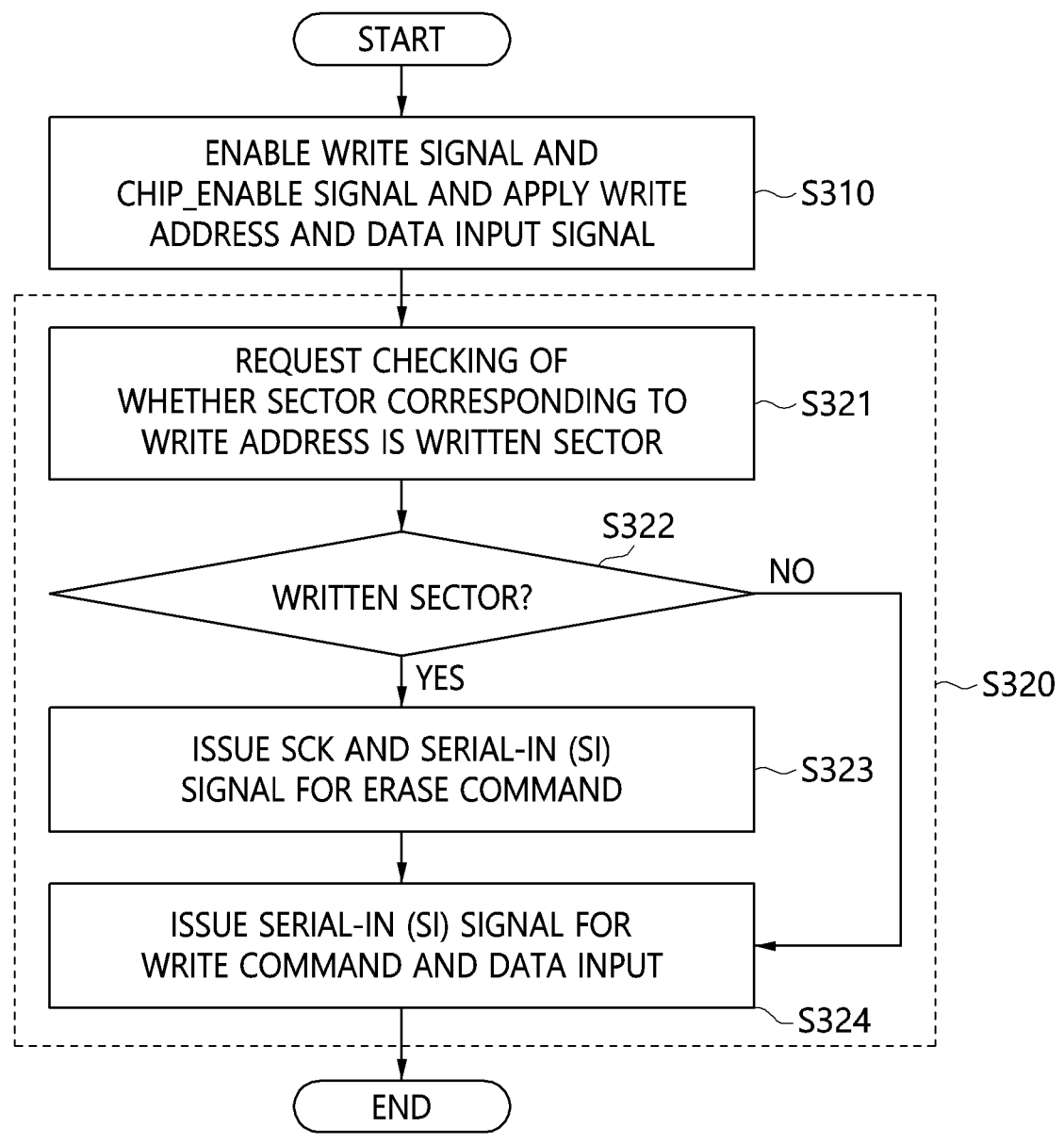
FIG. 5 is a flowchart for explaining a method of writing by a write protocol converter according to an embodiment.

FIG. 4 is a view for explaining input/output of a write protocol converter according to an embodiment, and FIG. 5 is a flowchart for explaining a method of writing by the write protocol converter according to an embodiment.

Referring to FIG. 4 and FIG. 5, the write protocol converter 120 may issue a serial clock (SCK) and a serial-in (SI) signal corresponding to a write command and data input at step S320 in order to write data to the nonvolatile memory 10 when a write signal and a chip_enable signal are enabled and a write address and a data input signal are applied at step S310.

Here, because a written sector in the nonvolatile memory 10 cannot be overwritten with data, writing becomes possible after an erase command is performed on the corresponding memory sector.

However, when writing is not yet performed on the sector after the erase operation is performed thereon, writing may be immediately performed without an erase operation.

Here, at step S320 according to an embodiment, the write protocol converter 120 requests the written sector checker 130 to check whether the sector corresponding to the write address in the nonvolatile memory 10 is a written sector at step S321.

That is, in order to prevent unnecessary erasing of a sector before writing, the written sector checker 130 checks whether the sector of the flash memory 10 is a sector that is written after an erase operation is performed thereon.

When it is determined at step S322 that the corresponding sector is a written sector, the write protocol converter 120 may issue a serial-in (SI) signal corresponding to an erase command before a write command at step S323.

Here, the write protocol converter 120 may automatically insert a serial-in (SI) signal corresponding to a write_enable command (WEN) before the write command or the erase command.

Conversely, when it is determined at step S322 that the corresponding sector is not a written sector, the write protocol converter 120 may immediately issue a serial-in (SI) signal corresponding to a write command and data input at step S324. That is, the erase command is skipped, and the write command after the second write_enable command (WEN) illustrated in FIG. 4 may be generated.

The embodiment is technology for controlling nonvolatile memory embedded in a PIM processor, as described above, and signals for read/write access to the nonvolatile memory are generated through a memory controller 100 capable of directly accessing the high-speed nonvolatile hardware, rather than through transfer of commands by a host processor.

The memory controller 100, including a read protocol converter 110, a write protocol converter 120, and a written sector checker 130, may enable a read operation or a write operation to be performed using a simple protocol method in the same manner as access to volatile memory (RAM) and thus has an advantage of reducing the input/output cycle of the nonvolatile memory.

FIG. 6 is a view illustrating a computer system configuration according to an embodiment.

The apparatus for controlling nonvolatile memory according to an embodiment may be implemented by being applied in a computer system 1000 including a computer-readable recording medium.

The computer system 1000 may include one or more processors 1010, memory 1030, a user-interface input device 1040, a user-interface output device 1050, and storage 1060, which communicate with each other via a bus 1020. Also, the computer system 1000 may further include a network interface 1070 connected with a network 1080. The processor 1010 may be a central processing unit or a semiconductor device for executing a program or processing instructions stored in the memory 1030 or the storage 1060. The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to the disclosed embodiment, nonvolatile memory such as flash memory may be simply and directly accessed like volatile memory, rather than using a method in which a host processor transfers commands for access.

Although embodiments of the present disclosure have been described with reference to the accompanying drawings, those skilled in the art will appreciate that the present disclosure may be practiced in other specific forms without changing the technical spirit or essential features of the present disclosure. Therefore, the embodiments described above are illustrative in all aspects and should not be understood as limiting the present disclosure.

What is claimed is:

1. An apparatus for controlling nonvolatile memory, comprising:
  nonvolatile memory; and
    a memory controller configured to issue a serial clock (SCK) to the nonvolatile memory, transfer data corresponding to a requested command to the nonvolatile memory or receive data corresponding to a requested command from the nonvolatile memory, and output the data to an outside through a serial-in (SI) or a serial-out in response to a read request or a write request, wherein the memory controller includes a write protocol converter configured to issue a serial-in signal corresponding to a write command and data input to the nonvolatile memory when a write signal and a chip enable signal are enabled and a write address and a data input signal are applied, and a written sector checker configured to check whether a sector corresponding to the write address in the nonvolatile memory is a written sector, and
    wherein the write protocol converter is configured to issue an SI signal corresponding to an erase command before the write command based on a result of checking by the written sector checker whether the sector corresponding to the write address in the nonvolatile memory is a written sector.

2. The apparatus of claim 1, wherein the memory controller includes a read protocol converter that issues a serial clock (SCK) and a serial-in (SI) signal corresponding to a read command to the nonvolatile memory when a read signal and the chip_enable signal are enabled and a read address is applied.

3. The apparatus of claim 2, wherein, when a serial-out (SO) signal corresponding to data requested to be read is output from the nonvolatile memory, the read protocol converter outputs the corresponding data to the outside.

4. The apparatus of claim 3, wherein the data output through the serial-out (SO) signal is output in units of bytes.

5. The apparatus of claim 1, wherein the write protocol converter automatically inserts a serial-in (SI) signal corresponding to a write_enable command (WEN) before the write command or the erase command.

6. A method for controlling nonvolatile memory, comprising:

receiving, by a memory controller, a write address and a data input signal when a write signal and a chip_enable signal are enabled; and checking, by the memory controller, whether a sector corresponding to the write address in the nonvolatile memory is a written sector;

issuing, by the memory controller, a serial-in (SI) signal corresponding to an erase command before a write command, based on a result of checking whether the sector corresponding to the write address in the non-volatile memory is the written sector; and issuing, by the memory controller, a serial clock (SCK) and a serial-in (SI) signal corresponding to the write command and data input to nonvolatile memory.

7. The method of claim 6, further comprising:

receiving a read address when a read signal and a chip enable signal are enabled; and issuing a serial clock (SCK) and a serial-in (SI) signal corresponding to a read command to nonvolatile memory.

8. The method of claim 7, further comprising:

in response to output of a serial-out (SO) signal corresponding to data requested to be read from the non-volatile memory, outputting the corresponding data to an outside, wherein the data output through the serial-out (SO) signal is output in units of bytes.

9. The method of claim 6, further comprising:

automatically, by the memory controller, inserting a serial-in (SI) signal corresponding to a write enable command (WEN) before the write command or the erase command.

* * * * *